United States Patent
Roth

(10) Patent No.: US 11,922,251 B2
(45) Date of Patent: Mar. 5, 2024

(54) PROCESS FOR RFID CERTIFICATION OF CARTON CONTENT

(71) Applicant: AVERY DENNISON RETAIL INFORMATION SERVICES, LLC, Mentor, OH (US)

(72) Inventor: Mark W. Roth, North Miami, FL (US)

(73) Assignee: Avery Dennison Information Services LLC, Mentor, OH (US)

( * ) Notice: Subject to any disclaimer, the term of this patent is extended or adjusted under 35 U.S.C. 154(b) by 174 days.

(21) Appl. No.: 15/827,641

(22) Filed: Nov. 30, 2017

(65) Prior Publication Data

US 2018/0157873 A1 Jun. 7, 2018

Related U.S. Application Data

(60) Provisional application No. 62/428,645, filed on Dec. 1, 2016.

(51) Int. Cl.
| | | |
|---|---|---|
| *G06Q 10/08* | (2023.01) | |
| *G06K 7/10* | (2006.01) | |
| *G06K 19/02* | (2006.01) | |
| *G06K 19/04* | (2006.01) | |

(Continued)

(52) U.S. Cl.
CPC ..... *G06K 7/10128* (2013.01); *G06K 7/10366* (2013.01); *G06K 19/025* (2013.01); *G06K 19/045* (2013.01); *G06Q 10/0833* (2013.01); *G06Q 10/087* (2013.01)

(58) Field of Classification Search
CPC ........... G06K 7/10128; G06K 7/10366; G06K 19/025; G06K 19/045; G06Q 10/0833; G06Q 10/087; G06Q 10/083
See application file for complete search history.

(56) References Cited

U.S. PATENT DOCUMENTS 10,163,071 B1 * 12/2018 Quan ................. G06Q 10/087
2005/0263592 A1 12/2005 Berger et al.
(Continued)

FOREIGN PATENT DOCUMENTS

EP 3065091 A1 * 9/2016 ............. G06Q 10/00

OTHER PUBLICATIONS

International Search Report and Written Opinion dated Jan. 30, 2018 issued in corresponding IA No. PCT/US2017/063902 filed Nov. 30, 2017.
(Continued)

*Primary Examiner* — Resha Desai
*Assistant Examiner* — Michelle E Carey

(57) ABSTRACT

A process for RFID certification of carton content. Cartons may be packed with a number of RFID-tagged items and sealed. A carton may then be placed in the proximity of a scanner, which may verify the number and type of items present in the container. The carton ID information and measured RFID data of the carton contents may then be compared to a database, and an RFID pack certification label prepared for the carton if there is no mismatch. Cartons may then be scanned after unloading at a distribution center and again after they are reloaded, for example by passing them through a door portal. Such a method may substantially reduce the costs of scanning and tracking items in a supply chain.

8 Claims, 3 Drawing Sheets

(51) Int. Cl.
 *G06Q 10/0833* (2023.01)
 *G06Q 10/087* (2023.01)

(56) References Cited

U.S. PATENT DOCUMENTS

| | | | |
|---|---|---|---|
| 2007/0040682 A1* | 2/2007 | Zhu | G06Q 10/087 340/572.1 |
| 2007/0102506 A1* | 5/2007 | Stevens | G06Q 10/08 235/376 |
| 2008/0231426 A1* | 9/2008 | Kamel | G06Q 10/087 340/10.4 |
| 2009/0251293 A1* | 10/2009 | Azevedo | G07F 11/62 340/10.1 |
| 2010/0052911 A1* | 3/2010 | Matsen | G06K 7/10178 340/572.7 |
| 2014/0091931 A1* | 4/2014 | Cova | G08B 13/12 340/568.2 |
| 2014/0222710 A1* | 8/2014 | Wheelock | G06Q 10/0833 705/333 |
| 2016/0117534 A1 | 4/2016 | Roth | |
| 2018/0096175 A1* | 4/2018 | Schmeling | B29C 64/10 |

OTHER PUBLICATIONS

Anonymous: "Electronic Product Code—Wikipedia," Mar. 3, 2016, XP055441940, Retrieved from the internet: https://en.wikipedia.org/w/index.php?title=Electronic_Product_Code&oldid=708111709, retrieved on Jan. 18, 2018.
International Preliminary Report on Patentability dated Jun. 13, 2019 issued in corresponding IA No. PCT/US2017/063902 filed Nov. 30, 2017.
AtlasRFIDstore, "6 Factors that Affect RFID Read Range," https://www.atlasrfidstore.com/rfid-insider/improve-rfid-read-range, posted Jul. 1, 2013.

* cited by examiner

PROCESS FOR RFID CERTIFICATION OF CARTON CONTENT

CROSS REFERENCE TO RELATED APPLICATION(S)

The present application claims priority to and the benefit of U.S. Provisional Utility Patent Application No. 62/428,645 filed on Dec. 1, 2016, which is incorporated herein by reference in its entirety.

BACKGROUND

The importance of RFID supply chain compliance labeling is dramatically increasing as more businesses are adopting RFID technology for use in tracking products. Initially, adoption of RFID technology was focused on store level inventory visibility. Many stores found that, by improving inventory accuracy through the use of RFID technology to track inventory, a higher inventory accuracy could be achieved, which had the potential to create significant sales uplift. Thus, a direct return on investment (ROI) could be extrapolated for the investment into the cost of RFID media as compared to the continued use of non-RFID media, providing cost-conscious businesses with appropriate motivation to make the transition to the use of RFID media to track product inventory.

In an effort to expand the ROI achievable through a transition to RFID technology, it has been found that significant benefits can be realized by having item-level visibility throughout a business's supply chain. However, in order to achieve the desired tracking of items throughout the supply chain with the appropriate RFID performance and read functionality, compliance with RFID guidelines at the item level becomes even more critical. Further, scanning and audit solutions must be implemented to support such initiatives.

Further, in many cases, distributors or retailers are reliant on a manufacturer or a distributor further up the supply chain to handle compliance with RFID guidelines. In some cases, retailers have encouraged 100% compliance with RFID guidelines from their suppliers by incorporating chargeback provisions for non-compliance with RFID guidelines into the purchasing contracts they have with those suppliers. This means that non-compliance with RFID guidelines will have immediate negative effects for a supplier, increasing their motivation to improve their RFID tagging procedures to the maximum extent practical. The number of retailers including such provisions in their purchasing agreements is expected to continue to rise as RFID technology continues to proliferate.

The increasing number of RFID compliance provisions that are now appearing in purchasing agreements have been likened to the barcode compliance provisions that found their way into many such agreements following the adoption of UPC barcode systems in years past. The need to label or tag items with UPC information and scannable barcodes quickly became critical to the success of retail sale operations. Point-of-sale barcode scanning of individual items became the norm at checkout counters around the globe. A supplier's compliance or noncompliance with barcode standards would have an immediate financial impact on retail operations, and similar "chargeback provisions" were thus instituted by most major retailers to penalize those suppliers not conforming to a retailer's business practices and requirements.

RFID is emerging as the next such standard in the evolution of standards for the identification of all goods. RFID technology offers certain advantages over barcode technology. For example, RFID functions beyond the visual spectrum limits of barcode, and, while barcode scanning of an item often required that the item be brought into close proximity with a barcode scanner, RFID scanning makes use of a portion of the radio frequency spectrum and has much looser proximity limitations. Additionally, barcode has the limitation of only identifying an item as part of a product group rather than uniquely identifying the item itself as is possible with RFID technology. As such, with RFID technology, items can be scanned and uniquely identified without direct physical access to the items themselves.

SUMMARY

According to an exemplary embodiment, a process for implementing RFID certification of carton content may be shown and described. According to an exemplary embodiment of the process, cartons may be packed with a number of RFID-tagged items and sealed. A carton may then be placed in the proximity of a scanner, which may verify the number and type of items present in the container. The carton ID information and measured RFID data of the carton contents may then be compared to a database, and an RFID pack certification label prepared for the carton if there is no mismatch. Cartons may then be scanned after unloading at a distribution center and again after they are reloaded, for example by passing them through a door portal.

Such a process may allow the contents of cartons to be fully audited without the requirement that the carton be opened by the auditor in order to verify its contents. Essentially, such a process may allow items to be tracked at the individual level at virtually every point through the supply chain as the items move from the point of manufacture to the point of sale. Such a method may thus provide true "track and trace" capability, down to the unique item level, that barcode labeling had not previously been able to provide.

In an embodiment, such a process may include a specific carton label provided at the source that may incorporate the advantages of RFID technology. Such a label may provide a quality assurance value at a point of manufacture, which may have significant downstream benefits throughout the supply chain.

In an embodiment, such a process may make use of specialized equipment that may be used to read an RFID label or plurality of RFID labels, and which may be used to distinguish the RFID signatures of the RFID labels from one another. For example, a high-density read chamber, as described in US Patent Application No. 2016/0117534, "High density read chambers for scanning and encoding rfid tagged items," herein incorporated by reference in its entirety, may be relied upon in order to provide radio-frequency interrogation of a particular carton containing RFID tagged items.

According to one exemplary embodiment of a process for implementing RFID certification of carton content, cartons may be scanned at the source, and all items bearing an electronic product code (EPC) may be recoded and checked for item and count accuracy against the expected pack list which might be a sheet of printed paper or an on line look up list. If the pack is found to be valid (that is, the expected pack list and the recorded pack list are perfect matches for one another), a label may be printed with the list of all of the EPC values or counts that are intended to be found within the carton. An RFID inlay may also be provided and may be embedded in the carton content label, which may be encoded with a unique value identifying it as an RFID Pack Certified label. The inlay in the RFID pack certified label may contain a unique number. That number may be the best "fit" to use the UCC 128 barcode data. In this example, the operator is no longer dependent on scanning and reading the record to induct the UCC128 data at touch point through the system. The invention may also add security tape or binding to the carton since the carton is now certified at source. This is becoming important in the fight against theft and pilferage. High value item pack cartons can now be rejected at any point along the supply chain and charged to the handler (transporter etc.) last placed in possession of said items. As you can imagine the payback on providing this visibility can be large on high dollar items.

Such a method may dramatically increase the functionality of RFID audit solutions by implementing a comprehensive RFID scanning solution designed specifically for carton interrogation, and combining the comprehensive RFID scanning solution with an RFID printer configured to print an RFID inlay embedded in a carton content label. Such a method may allow cartons to be validated at their source, and may allow data from the carton to be captured and logged at the source. This means that quality and pack accuracy may now be easily determined at the source, ensuring that only cartons having the appropriate quality and pack accuracy are passed along. The application of a visible label including such information, declaring this accuracy, and including RFID encoding may also ensure more efficient downstream processing.

Such a method may offer improved functionality over item-specific labeling because the use of an RFID pack certified label may offer advantages that item labels typically do not have, that being the larger form factor of the carton label itself. RFID inlays that may be provided within individual item labels may be constrained by small or narrow dimensions of the label or tag. The smaller the item is, the smaller the item label typically must be, and the smaller the RFID inlay therefore must be, which will serve to limit at least the antenna profile of the inlay. A smaller antenna of the RFID inlay will mean a smaller performance range of the transponder; for some items, this range may be highly limited. The use of a carton label may allow RFID inlays having consistently large antennas to be used, ensuring adequate range and performance of the RFID aspect regardless of the sizing of the internal items and the RFID inlays affixed to them.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
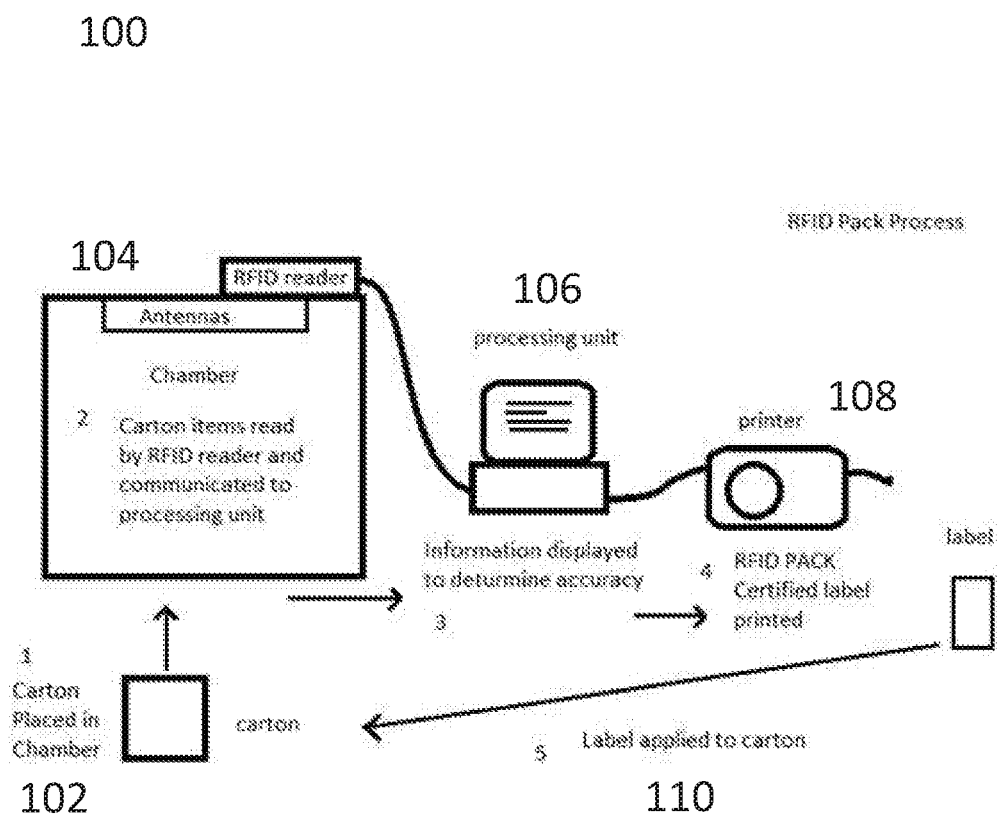
FIG. 1 is an exemplary embodiment of a process for RFID certification of carton content.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Today there are missing pieces in the entire supply chain as RFID may be put into play in an ad hoc manner by different users (i.e. companies). For instance, a company may choose to only place RFID tags on items in the store. Applying UM technology only in that manner, leaves out other benefits of the utilization of RFID technology for the rest of the supply chain. In one embodiment presently contemplated, a source of an item or article that manufactures the items, tags the items with RFID. Not only do they tag the item(s) but the factory employs some means to validate the proper item and quantities that are packed into a carton. For instance, the source use the HDRC solution described in this application to read all the RFID tags in the carton prior to shipment. This is the aggregate of all items in the carton, and leverages the ability of a user to insure correct packing, certifying that the sealed carton has been packed and applies a large format RFID carton label on the outside of the carton declaring that the contents are accurately counted. This large carton label, which will be discussed in more detail later on in this application, allows down steam processes throughout the supply chain to process the received cartons at a much faster and more accurate pace as now they only need look for the RFID certification label instead of every single item within the carton itself.

Typically, users, such as factories, today only apply the RFID label/tag simply to meet their customer's (retailer) requirement to do so without deriving any benefits themselves. So in turn, the retailer has to create elaborate audit systems to insure they are receiving the proper items and quantities as balanced against the PO that initiated the order.

Turning now to exemplary FIG. 1, FIG. 1 shows an exemplary embodiment of a process for RFID certification of carton content. In an exemplary embodiment, a carton may first be prepared 102, which may include packing the carton with one or more RFID-tagged items. The carton may then be sealed, and may be placed in the proximity of a RFID scanner. If this is a HDRC it would be placed in the tunnel, if it is in the tunnel then it would pass through the tunnel. If a hand held scanner is used what is in the vicinity would be read.

For example, according to one exemplary embodiment, a carton may be placed into a high-density RFID read chamber, which may perform accuracy evaluation on the contents of the carton 104. When placed into the high-density read chamber, the carton ID may be scanned and the door to the chamber may be closed. The high-density read process may then be initiated, which may be accomplished by, for example, a user pressing a start button on a processing unit linked to the high-density read chamber, which may activate an RFID reader of the high-density read chamber, which may in turn send signal through one or more connected antennas.

The sending of signal through the one or more connected antennas may energize the RFID tags of the one or more RFID-tagged items. This may cause the RFID tags of the items to respond with a return signal to the antennas and the reader, indicating the EPC values of the items. After the return signal is received by the reader, this signal may be communicated to a processing unit 106.

Once the signal has been received by a processing unit 106, a lookup may be initiated for the carton ID, and data may be retrieved from a database regarding what items were to be packed in the carton. The processing unit may then compare the information retrieved from the database, a second information, to the RFID tag data that was received from the reader of processing unit 106, a first information. If the data retrieved from the database matches the RFID tag data that was received from the reader of processing unit 106, in an exemplary embodiment, an RFID Pack Certification label may then be printed 108. Such an RFID Pack Certification label may show the total count of items contained within the carton, as well as a list of each item that is contained within the carton. In a next step, the label may be applied to the carton 110, and the carton may be designated as ready to ship. The inlay used in the RFID Pack Certification label may be designed in such a way that if an attempt to remove or cut the label is made to gain access to the carton's contents the RFID inlay becomes deactivated or detuned. That inactive or detuned tag can also be used to identify carton integrity issues.

However, in some cases, there may be a mismatch between the information retrieved from the database and the information received from the reader of processing unit 106. For example, there may be a mismatch in the number of items, or there may be a mismatch in what items were packed in the container, each of which may be termed an item count mismatch. If there is an item count mismatch, then the carton may be removed from the reader (such as the high-density read chamber), the seal of the carton may be broken, and an evaluation may be performed; for example, the operator of the read chamber may manually perform such an inspection. In an embodiment of the process, the operator of the read chamber may then correct the carton to have the proper number and type of item. The carton may then be re-scanned and re-evaluated in order to ensure that the carton has been properly corrected and that the source of the error had been properly identified. A certification label may then be printed 108 and applied to the carton 110, after which the carton may be ready to ship.

In an exemplary embodiment, cartons may be prepared for shipment by placing them on a pallet. Each of these pallets may be scanned, prior to loading of the pallet for transport, by an RFID reader, which may be mounted in a fixed station or which may be provided in a handheld RFID reader. For example, according to an exemplary embodiment, a fixed station may be a door portal through which a pallet may be passed as the pallet is loaded into a container or semi-trailer for transport. In an embodiment, the pallet may be isolated in order to avoid an over-read situation, which may be caused by adjacent RFID inventory.

The cartons may be shipped in a shipping container and received in a new location. Upon receipt of the cartons at a distribution center or at some other receiving operation, the cartons may be unloaded, for example by pallet load. The cartons may then be scanned as pallets, or may be individually unloaded for further sortation and re-routing.

In an exemplary embodiment, the cartons may be scanned at pallet level. In such an embodiment, a door portal may be used to provide scanning of each of the pallets, which may take place, for example, as the shipping container is unloaded. In another exemplary embodiment, the cartons may be individually unloaded and scanned, for example on a conveyor, and scanned on the conveyor. For example, in an embodiment, the cartons may be passed through a scanning tunnel mounted over the conveyor.

In an exemplary embodiment, a recipient of the cartons may perform only carton-level scanning of each carton, and may, for example, scan only the RFID Pack Certified carton labels as acknowledgement of receipt. In another exemplary embodiment, when the cartons are scanned (for example, at pallet level or individually), the receiver may also perform item-level scanning of each carton, together with or even instead of scanning the RFID Pack Certified carton labels, in order to validate the completeness of each of the cartons and acknowledge receipt.

In an exemplary embodiment, items may be scanned at an intermediate stage after being shipped. For example, in an exemplary embodiment, items may be shipped to a distribution center, scanned, and then cross-docked or staged and re-palletized for shipment out of the distribution center. Items may be scanned after being unloaded in the distribution center as well as prior to being shipped. For example, in an exemplary embodiment, a door portal may be used to scan both incoming and outgoing items. In an embodiment, such a door portal may provide a track and trace function of carton IDs, providing a "last seen" location for the carton IDs just prior to the entry of the carton IDs into a semi-trailer.

In an exemplary embodiment, the cartons may then be shipped to a retailer. At that point, the store receiving the items may be able to focus on scanning only the RFID carton labels, rather than scanning each individual item, to enter the items into inventory. This may provide acknowledgement of receipt of the items to the store systems. In an exemplary embodiment, the items may be automatically populated into the database as active inventory once scanned. In an embodiment, the box and the carton label may be removed from a database of active items and may be discarded once they reach the store, as once there, they may each have fulfilled their designed purpose.

In some exemplary embodiments, containers may extend to multiple sets of items, or items intended for multiple destinations. For example, according to an exemplary embodiment, a carton may be created which represents multiple stock keeping units (SKUs) and which may carry inventory for multiple locations or may carry multiple types of inventory. In such an embodiment, a mixed SKU carton may be opened and partially unloaded, and then resealed. In another embodiment, a mixed SKU carton may be opened, partially unloaded, repacked with other goods, and then resealed. In such an embodiment, a similar process to that done at the source may be implemented; for example, according to an exemplary embodiment, the carton may be scanned with a high-density read chamber after being repacked and sealed and prior to being shipped. In an embodiment, a new RFID Pack Certified label may be printed 108 for the repacked carton after it is repacked, and the label 110 may be applied to the carton instead of or in addition to the RFID Pack Certified label already applied to the carton.

Figure 2:
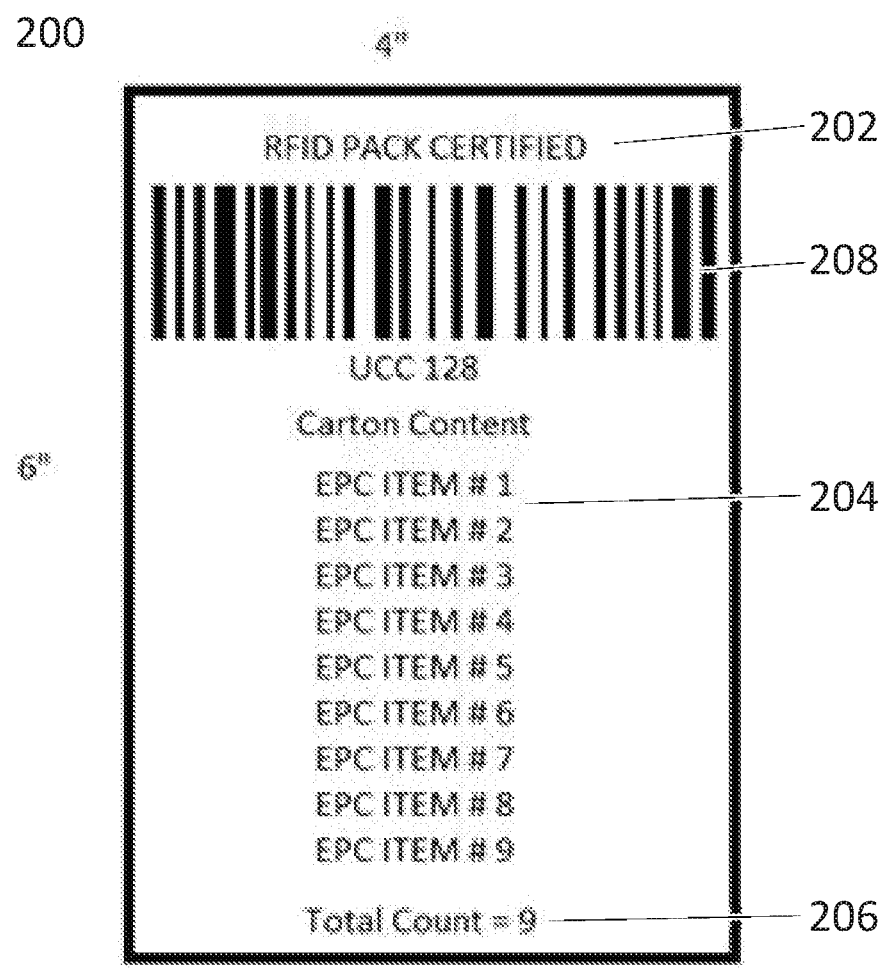
FIG. 2 is an exemplary embodiment of a carton content label as used in a process for RFID certification of carton content.

Turning now to exemplary FIG. 2, FIG. 2 shows an exemplary embodiment of an RFID Pack Certification label 200 that may be applied to a carton. In an exemplary embodiment, a label 200 may feature identification text 202 identifying it as an "RFID Pack Certified" label, may feature a list of individual items stored within the container 204, and may feature a total item count 206. Optionally, according to an exemplary embodiment, a label 200 may include barcode information 208, which may be scanned with a barcode scanner to provide some or all of the information that would be provided by scanning the RFID Pack Certification label 20 with an RFID scanner. This may ensure that the label 200 is compatible with existing barcode-based systems as well as RFID systems, which may ensure that existing systems can continue to be used where necessary. Further, although the dimensions of the label 200 in exemplary FIG. 2 are shown as a 6" length and a 4" width, it may be appreciated that these dimensions may be approximate or other dimensions for label 200 may be utilized, as desired.

Figure 3:
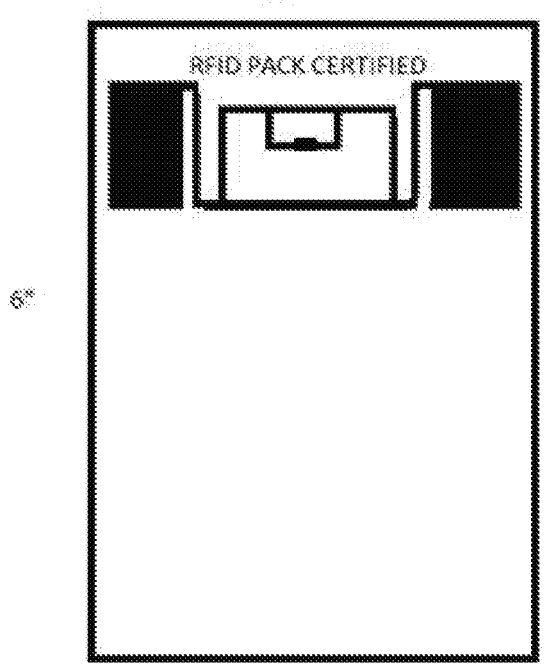
FIG. 3 is an exemplary embodiment of a carton content label as compared to an item label.
Figure 3:
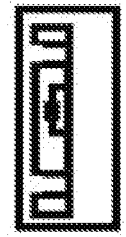

Turning now to exemplary FIG. 3, FIG. 3 shows an exemplary embodiment of an RFID Pack Certification label 200 compared to an item label 300. In an exemplary embodiment, an RFID Pack Certification label 200 may be appreciably larger than a label that is intended to be applied to a particular item 300, and the RFID inlay provided within the RFID Pack Certification label 200 may likewise be substantially larger than the RFID inlay provided within an item label 300, which may increase the distance at which the RFID inlay in the RFID Pack Certification label 200 may be read. Further, and similar to the above, although item label 300 in FIG. 3 is shown as having a 3" length and a 1" width, it may be appreciated that these dimensions may be approximate or other dimensions for item label 300 may be utilized, as desired.

In one embodiment, a security aspect is incorporated into the label 200 in that if the label is cut and or the inlay is cut this triggers the need for an audit. This is Much like security tape is used on cartons in the current marketplace, whereby if the tape is found to be cut at any point along the supply chain, the package is considered compromised. With the Avery Dennison certified label 200 the label become much more useful and interactive than labels currently in the market place as at any point the RFID may be engaged and it reports the status. If the RFD is not seen and is in an altered state, the package is considered compromised.

Additionally, in one embodiment contemplated presently, a OR code or some other 2D code is printed on the label 200 and in combination with RFID carries significant value to the supply chain. Things like carton content and country of origin information can then be encoded into the label 200. Now at any point along the supply chain what is in the carton can be evaluated without the need to open the carton. In another embodiment, in combination with RFID a user can read all the inlays contained within the carton and compare with information contained within the barcode.

Referring now generally to the Figures, in an embodiment, such a process described herein may be anticipated to have a significant impact if integrated into the supply chain of one or more businesses. For example, according to an exemplary embodiment of the process, upon arrival at a distribution center, items may be scanned at significantly higher speeds than was previously possible. For example, according to an exemplary embodiment, items may be scanned as they are being unloaded by passing the items, loaded on pallets, through a door portal; this may effectively eliminate the requirement to separately scan the items after they are unloaded in the distribution center. In an exemplary embodiment, the presence of an RFID Pack Certification label on a carton may further indicate that the carton has been previously validated, removing the need for the scanning systems at the distribution center to look for labels other than the RFID Pack Certification label.

In an exemplary embodiment, such an implementation may also eliminate scanning as a factor that may dictate conveyor speed. Further, it may also affect whether or not conveyor gaps may be present. Each of these may reduce the costs of conveyance of cartons significantly, by allowing existing infrastructure to be retooled to improve efficiency. For example, according to an exemplary embodiment, conveyor-based scanning systems would no longer be required to slow down the conveyor speeds and create gaps between cartons in order to ensure that the scanning systems have enough time to scan each carton at an item-detail level. Instead, according to an exemplary embodiment, conveyor scanning tunnels may only be configured to perform aggregation of EPC data to Uniform Code Council (UCC) code data, which may be done no matter at what point the EPC data is seen within an RF field. This may permit the conveyance of cartons to be accomplished without a requirement to include spacing between cartons, which may thus allow scanning tunnels to be run at full power. In such a scenario, the EPC-tagged items may be known from the data generated at the source, and may be tied to the proper advanced shipping notification (ASN) for a carton, which may ensure that there are no under-reads or over-reads of cartons.

According to an exemplary embodiment, such an improvement may be realized for a variety of reasons. First, significantly, the carton is now certified at the source. Because of this, not only is the carton count known, but the individual EPC values of the items in the carton will have already been recorded. This may facilitate taking an aggregate approach with regards to RFID audit scanning of the containers at the distribution center.

According to an exemplary embodiment, such an aggregate approach may be as follows. Instead of requiring a scanner to scan and record the individual item counts and EPC values as would be done in metered and speed-restricted tunnel scanning, the individual item counts are already known. Typically, scanning tunnels that have been configured to operate in such an environment are fairly expensive, as the RF field within the tunnel must be carefully controlled, which adds cost for custom antennas to be employed within the tunnel and requires specific signal mitigation techniques to be used. Making use of an aggregate approach may reduce the need for a carefully-controlled RF field and may thus reduce cost.

Additionally, the use of an aggregate approach may eliminate the need for the tunnel scanner to incorporate a barcode scanner. Such a method may eliminate the need to scan barcodes disposed on the container (such as UCC 128 barcodes) as the data that would normally be contained in the barcode is now encoded in the RFID inlay of the RFID Pack Certified carton content label. This may further increase processing speed, as the use of a barcode scanner requires that line-of-sight visibility be established between the scanner and the barcode. Under circumstances wherein the UCC 128 barcode is allowed to be placed on any side of a carton, or wherein the carton may be conveyed on any one of its faces, this may require that multiple scanners be provided on multiple sides of the container so that the barcode can be scanned regardless of what face the barcode ends up on. Instead, an RFID scan of the label may function based on proximity to the sensor rather than based on line-of-sight, ensuring that the label can be read and analyzed regardless of what face it is provided on.

According to an exemplary embodiment, the use of an aggregate approach may require a scanning tunnel to look only for a larger form factor, high RF performance RFID Pack Certified label demonstrating that the carton has been received. Once an RFID Pack Certified label is scanned by a scanner, a processor coupled to the scanner may then combine the data captured from the RFID Pack Certified label with the data that has been sent from the source, which may allow the processor to determine the number of items present in the carton bearing the RFID Pack Certified label. By combining said data for all of the scanned cartons, the processor may then be able to determine the sum total of items that have been received in a particular session. This means that, essentially, the comparison of ASN data (that is, data sent from the source) and EPC data (that is, the RFID Pack Certified labels) may yield the sum total number of items that have been processed in a particular session.

In an exemplary embodiment, the use of an aggregate approach may also reduce cross-docking time. As the system is now required only to detect and read an RFID Pack Certified label in order to determine whether the carton has met the appropriate quality criteria, no complex divert processes need to be implemented in order to ensure that the carton is properly certified to be complete, and the carton can be cross-docked between the receiving dock and the outbound shipping dock in substantially less time.

In an exemplary embodiment, the use of an aggregate approach may also reduce the complexity of pallet scanning. Without the use of RFID Pack Certified labels, in order to validate the number and type of items in a carton, each RFID item in every carton in a stack on a pallet must each be scanned and validated. Instead, with the use of RFID Pack Certified labels, a scan solution only needs to accomplish energizing and capturing the larger RFID Pack Certified carton content label. This may be significantly easier to accomplish than the alternative, and is again a task that may be accomplished via, for example, a door portal, rather than a detailed scan that must be manually performed.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A process for radio frequency identification (RFID) certification of carton content, the process comprising:
(a) preparing a carton with one or more RFID-tagged items, wherein the carton comprises a carton ID;
(b) placing the carton into an RFID read chamber and activating an RFID read process via a processing unit linked to the RFID read chamber;
(c) scanning the carton for a first information comprising electronic product codes (EPCs) of the one or more RFID-tagged items;
(d) communicating the first information from the RFID-tagged items to the RFID read chamber;
(e) initiating a lookup for the carton ID and retrieving from a database a second information, uploaded to the database prior to the scanning in (c), the second information comprising information regarding the RFID-tagged items that were to be packed in the carton;
(f) comparing the first information matches with the second information retrieved from the database;
(g) correcting any mismatch between the first information and the second information;
(h) printing a label with the EPC values or a count of the RFID-tagged items after the first information and the second information match;
(i) encoding an RFID inlay of the label with data, wherein the encoded data is one of a unique value identifying the label as an RFID Pack Certified label and a best fit to UCC 128 barcode data, and wherein the RFID inlay is included in the printed label; and
applying the label to the carton.

2. The process of claim 1, wherein the RFID read process is initiated by a user pressing a start button on the processing unit linked to the RFID read chamber.

3. The process of claim 1, further comprising deactivating the RFID Pack Certification Label if the RFID Pack Certification Label is removed or cut.

4. The process of claim 1, wherein the data from the source is advanced shipping notice (ASN) data.

5. The process of claim 1, wherein the at least one RFID Pack Certified Label comprises a 2-D code.

6. The process of claim 1, wherein the processor is configured to determine a sum total of the RFID tagged items received in a session by combining the data captured from the RFID Pack Certified Label with the data from the source for each respective one of the one or more cartons.

7. The process of claim 1, further comprising printing a label comprising all of the EPCs of all of the RFID-tagged items when the first information and the second information match.

8. The process of claim 1, further comprising inspecting the carton to determine a source of a mismatch when the first information and the second information do not match.

* * * * *